United States Patent
Chen et al.

(10) Patent No.: US 12,328,256 B2
(45) Date of Patent: Jun. 10, 2025

(54) SUPPORTING OVERLAPPING NETWORK ADDRESSES UNIVERSALLY

(71) Applicant: Palo Alto Networks, Inc., Santa Clara, CA (US)

(72) Inventors: Jia Chen, Palo Alto, CA (US); Hao Long, Campbell, CA (US); Shu Lin, Saratoga, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 251 days.

(21) Appl. No.: 17/884,844

(22) Filed: Aug. 10, 2022

(65) Prior Publication Data

US 2024/0056388 A1 Feb. 15, 2024

(51) Int. Cl.
*H04L 45/00* (2022.01)
*H04L 9/40* (2022.01)
*H04L 45/586* (2022.01)
*H04L 45/745* (2022.01)

(52) U.S. Cl.
CPC ............ *H04L 45/54* (2013.01); *H04L 45/586* (2013.01); *H04L 45/745* (2013.01); *H04L 63/0227* (2013.01)

(58) Field of Classification Search
CPC ..... H04L 45/54; H04L 45/586; H04L 45/745; H04L 63/0227; H04L 63/0272; H04L 63/20
See application file for complete search history.

(56) References Cited

U.S. PATENT DOCUMENTS

| | | | |
|---|---|---|---|
| 11,025,542 B2 * | 6/2021 | Anderson | H04L 45/74 |
| 2021/0067486 A1 * | 3/2021 | Souhrada | H04L 12/4641 |
| 2021/0218598 A1 * | 7/2021 | Ganapathy | H04L 45/64 |
| 2022/0239556 A1 * | 7/2022 | Boucadair | H04L 43/0811 |
| 2022/0321470 A1 * | 10/2022 | Qian | H04L 45/16 |
| 2023/0336473 A1 * | 10/2023 | Trujillo | H04L 45/64 |
| 2023/0337113 A1 * | 10/2023 | Trujillo | H04W 40/28 |
| 2024/0056388 A1 * | 2/2024 | Chen | H04L 63/0272 |
| 2024/0195784 A1 * | 6/2024 | Yu | H04L 63/0272 |

* cited by examiner

*Primary Examiner* — Jerry B Dennison
(74) *Attorney, Agent, or Firm* — Van Pelt, Yi & James LLP

(57) ABSTRACT

Techniques for supporting overlapping network addresses universally are disclosed. A system, process, and/or computer program product for supporting overlapping network addresses universally includes generating at least two virtual routers for a cloud security service, the at least two virtual routers including a first virtual router and a second virtual router, routing cloud security service packets using the first virtual router, and routing enterprise subscriber packets using the second virtual router.

17 Claims, 12 Drawing Sheets

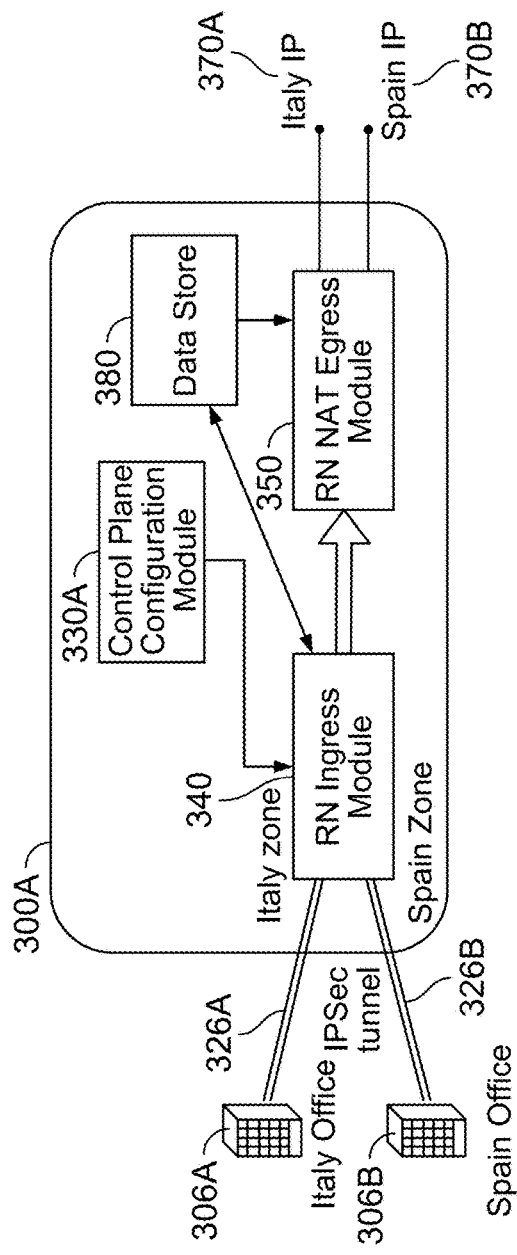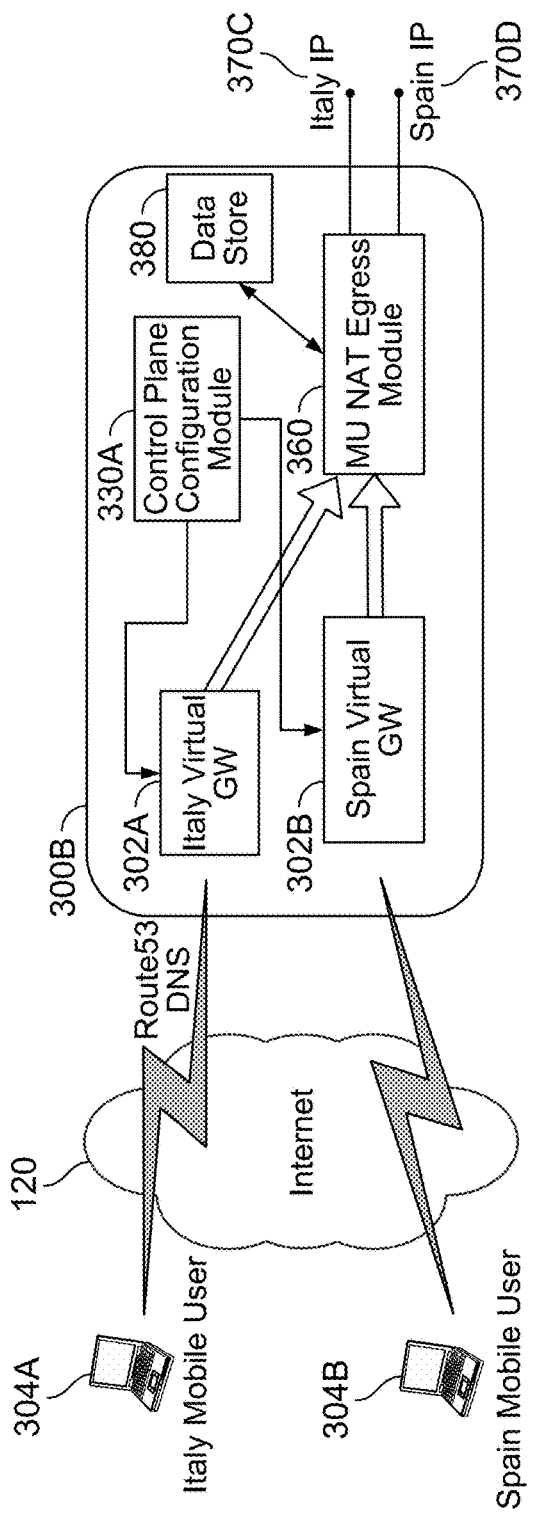
FIG. 3A
FIG. 3B

SUPPORTING OVERLAPPING NETWORK ADDRESSES UNIVERSALLY

BACKGROUND OF THE INVENTION

A firewall generally protects networks from unauthorized access while permitting authorized communications to pass through the firewall. A firewall is typically a device or a set of devices, or software executed on a device, such as a computer, that provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

FIGS. 3A and 3B are system block diagrams that illustrate example components of a network gateway a cloud-based security service in accordance with some embodiments.

DETAILED DESCRIPTION

Figure 1:
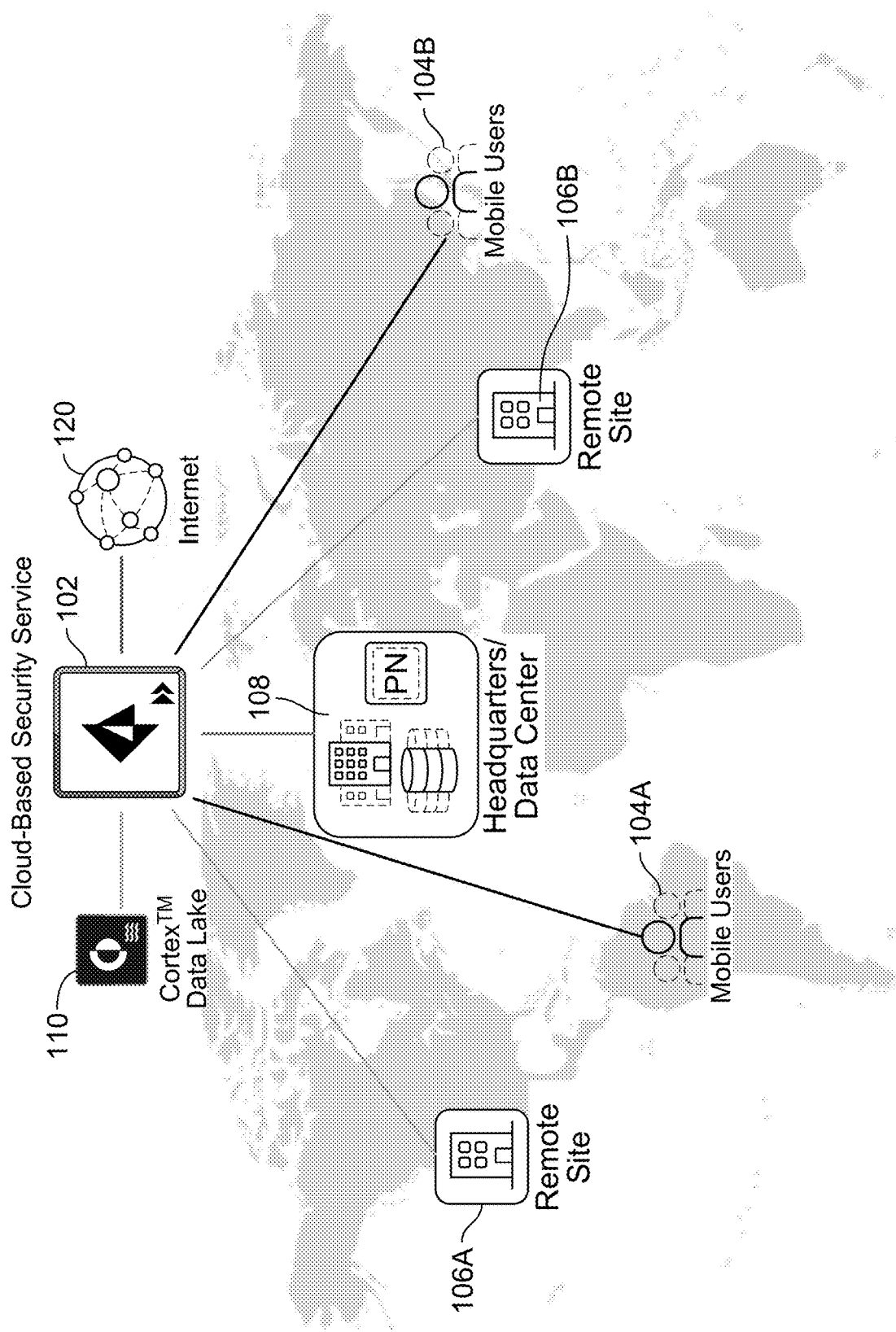
FIG. 1 is a system diagram overview of an example cloud-based security service in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Advanced or Next Generation Firewalls

Malware is a general term commonly used to refer to malicious software (e.g., including a variety of hostile, intrusive, and/or otherwise unwanted software). Malware can be in the form of code, scripts, active content, and/or other software. Example uses of malware include disrupting computer and/or network operations, stealing proprietary information (e.g., confidential information, such as identity, financial, and/or intellectual property related information), and/or gaining access to private/proprietary computer systems and/or computer networks. Unfortunately, as techniques are developed to help detect and mitigate malware, nefarious authors find ways to circumvent such efforts. Accordingly, there is an ongoing need for improvements to techniques for identifying and mitigating malware.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices or security devices, such as computer servers, gateways, network/routing devices (e.g., network routers), or data appliances (e.g., security appliances or other types of special purpose devices, and in some implementations, certain operations can be implemented in special purpose hardware, such as an ASIC or FPGA).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as described herein). A firewall can also filter local network (e.g., intranet) traffic by similarly applying a set of rules or policies.

Security devices (e.g., security appliances, security gateways, security services, and/or other security devices) can perform various security operations (e.g., firewall, anti-malware, intrusion prevention/detection, proxy, and/or other security functions), networking functions (e.g., routing, Quality of Service (QoS), workload balancing of network related resources, and/or other networking functions), and/or other security and/or networking related operations. For example, routing can be performed based on source information (e.g., IP address and port), destination information (e.g., IP address and port), and protocol information (e.g., layer-3 IP-based routing).

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., using application layer filtering firewalls or second generation firewalls, which work on the application level of the TCP/IP stack). Application layer filtering firewalls or application firewalls can generally identify certain applications and protocols (e.g., web browsing using Hyper-Text Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content. In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls).

For example, Palo Alto Networks' next generation firewalls enable enterprises to identify and control applications, users, and content—not just ports, IP addresses, and packets— using various identification technologies, such as the following: App-ID for accurate application identification, User-ID for user identification (e.g., by user or user group), and Content-ID for real-time content scanning (e.g., controls web surfing and limits data and file transfers). These identification technologies allow enterprises to securely enable application usage using business-relevant concepts, instead of following the traditional approach offered by traditional port-blocking firewalls. Also, special purpose hardware for next generation firewalls implemented, for example, as dedicated appliances generally provide higher performance levels for application inspection than software executed on general purpose hardware (e.g., such as security appliances provided by Palo Alto Networks, Inc., which utilize dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' firewalls, which support various commercial virtualized environments, including, for example, VMware® ESXi™ and NSX™, Citrix® Netscaler SDX™ KVM/OpenStack (Centos/RHEL, Ubuntu®), and Amazon Web Services (AWS)). For example, virtualized firewalls can support similar or the exact same next-generation firewall and advanced threat prevention features available in physical form factor appliances, allowing enterprises to safely enable applications flowing into, and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

Technical Challenges for Cloud-Based Security Service Providers

Firewalls can prevent a customer from using a shared address space (e.g., 100.64/10) defined in RFC 6598. Because the firewalls use the same RFC 6598 address space, the overlapping addresses are not routable through the default virtual router of a security service provider. The overlapping addresses can prevent the security service provider from onboarding new customers using the shared address space. Also, existing customers may need to use RFC 6598 addresses because of the exhaustion of IPv4 addresses.

Thus, what are needed are new and improved techniques for supporting overlapping network addresses universally for a cloud-based security service.

In some embodiments, a system/method/computer program product for supporting overlapping network addresses universally includes generating at least two virtual routers for a cloud security service, wherein the at least two virtual routers include a first virtual router and a second virtual router, routing cloud security service packets using the first virtual router, and routing enterprise subscriber packets using the second virtual router.

In some embodiments, the first virtual router includes a first routing table, and the second virtual router includes a second routing table.

In some embodiments, the cloud security service includes a policy-based forwarding rule to guarantee a symmetric return for Internet bound traffic.

In some embodiments, a cloud security service provider and an enterprise subscriber have an overlapping IP address space.

In some embodiments, the overlapping IP address space includes RFC 6598 IP addresses.

In some embodiments, the overlapping IP address space includes RFC 1918 IP addresses.

In some embodiments, the overlapping IP address are separated and become routable using the at least two virtual routers, the first virtual router has a first routing table, and the second virtual router has a second routing table.

In some embodiments, the first virtual router is dedicated for a cloud security service provider IP address space, the first virtual router has a first routing table, the second virtual router is dedicated for an enterprise subscriber IP address space, and the second virtual router has a second routing table.

In some embodiments, traffic originating from a client associated with an enterprise subscriber destined for a data center associated with the enterprise subscriber is routed using a routing table lookup via a customer routing table associated with the second virtual router.

In some embodiments, traffic originating from a client associated with an enterprise subscriber destined for an Internet site is routed using a chained routing table lookup.

In some embodiments, the cloud security service includes a set of firewalls for security filtering of network traffic to/from a network of an enterprise subscriber.

FIG. 1 is a system diagram overview of an example cloud-based security service in accordance with some embodiments. In this example cloud-based security service shown at 102, various mobile users 104A and 104B, remote sites 106A and 106B (e.g., to secure remote network locations, such as branch offices and remote networks, and users in those branches with cloud-based next-generation firewalls), as well as a headquarters/data center 108 of an enterprise customer(s) are in communication with the cloud-based security service. A data store 110 (e.g., a Cortex™ Data Lake or another data store solution) is also in communication with the cloud-based security service for storing various logs and/or other information for the cloud-based security service.

For example, the cloud-based security service can provide various firewall, VPN (e.g., establishing IPsec tunnels using one or more IP address pools to allow the service to assign IP addresses for the client VPN tunnels to facilitate secure communication between, for example, internal resources in the customer's enterprise network, the enterprise customers mobile users, and users in their remote network/site locations), and other security related services for the mobile users, remote sites, and headquarters/data center based on policies (e.g., security policies configurable by the enterprise customer), such as for secure access to web sites/services (e.g., including SaaS provider services) on the Internet shown at 120.

Figure 2A:
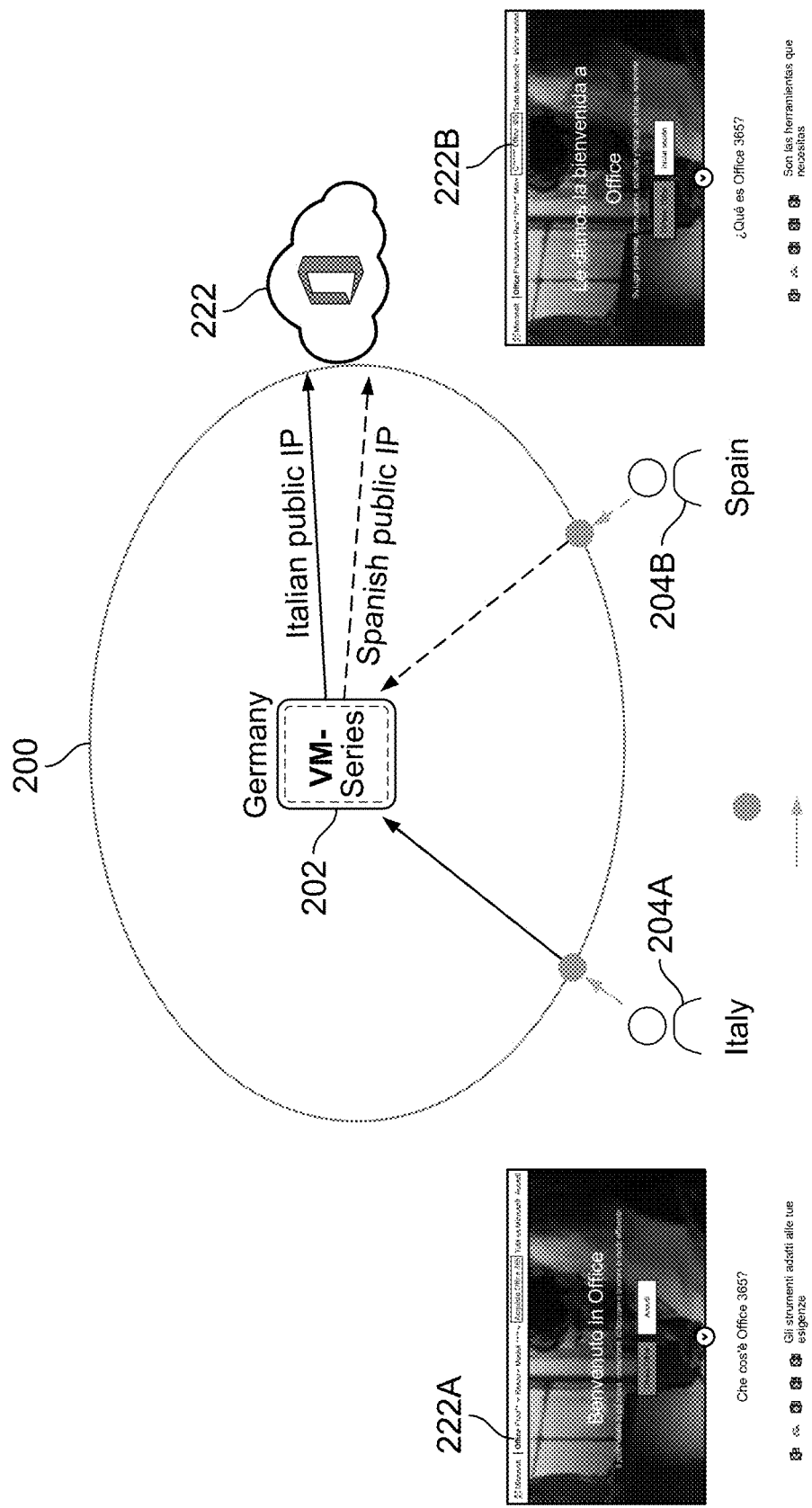
FIG. 2A is a system diagram of an example cloud-based security service in accordance with some embodiments.

FIG. 2A is a system diagram of an example cloud-based security service in accordance with some embodiments. For example, a cloud-based security service 200 can be implemented using a commercially available public cloud solution, such as the Google Cloud Platform (GCP), to facilitate a low latency for supported SaaS providers (e.g., Microsoft Office 365® as shown and/or other supported SaaS providers, such as Salesforce®, etc.) as well as implementing the disclosed techniques for an enhanced local experience for users of the cloud-based security service when they are connecting to web sites/services on the Internet including such SaaS provider solutions available on the Internet. As will be apparent to one of ordinary skill in the art, the disclosed techniques can similarly be implemented using public cloud solutions that are commercially available from other public cloud service providers, a combination of various public cloud service providers, or also by using regional data centers maintained/controlled by the cloud-based security service provider, or any combination thereof.

Referring to FIG. 2A, a network gateway 202 of cloud-based security service is 200 implemented as a virtual network gateway 202 (e.g., a security platform, such as a firewall solution available from Palo Alto Networks, Inc., or another commercially available security platform solution can similarly be configured to implement the network gateway as disclosed herein) executing on a server in a data center. In this example, the network gateway is executed on a server in a data center of the GCP located in Germany. A user 204A, who is located in Italy, is securely connected (e.g., via an IPsec tunnel or another secure/Virtual Private Network (VPN) connection) to network gateway 202 that is located in Germany (e.g., the cloud-based security service provides an agent that is executed on the endpoint device of user 204A to automatically and securely connect the user to the nearest regional network gateway, in which the enterprise customer can, for example, select locations in the cloud-based security service that function as cloud-based network gateways to secure their mobile users, such as will be further described below). Similarly, a user 204B, who is located in Spain, is securely connected to network gateway 202 that is located in Germany. In an example implementation, the cloud-based security service also provides an agent (not shown) (e.g., an endpoint agent, such as the GlobalProtect agent available from Palo Alto Networks, Inc.) that can be executed on various computing platforms such as the endpoint devices (e.g., endpoint devices executing various Operating Systems (OSs), such as Linux OS, Microsoft Windows® OS, Apple Mac OS®, Apple iOS®, and Google Android® OS) of users 204A and 204B (e.g., as well as of other users and data appliances, servers, etc.) that facilitates such automatic and secure connections to the nearest gateway and/or based on other criteria (e.g., latency, workload balancing, etc.).

As shown in FIG. 2A, using the disclosed techniques, network gateway 202 automatically performs a Source NAT (SNAT) operation to assign an Italian public IP address (e.g., a public IP address that is associated with the geo location of Italy) as the egress IP address to be associated with the session for user 204A when connecting with the Microsoft Office 365® service shown at 222. Similarly, network gateway 202 automatically performs a SNAT operation to assign a Spanish public IP address (e.g., a public IP address that is associated with the geo location of Spain) as the egress IP address to be associated with the session for user 204B when connecting with the Microsoft Office 365® service shown at 222.

As shown at 222A and 222B, users 204A and 204B of the cloud-based security service can connect through network gateway 202 to access various SaaS applications, such as Microsoft Office 365® (e.g., and/or other Internet web sites/services), and such will be rendered/provided in the local language associated with each user's respective location as a result of the above-described SNAT operations performed by network gateway 202 (e.g., absent such SNAT operations, the SaaS applications such as Microsoft Office 365® would infer that the users are located in Germany based on the public IP address(es) associated with network gateway 202 that is located in Germany (e.g., a public IP address(es) that is associated with the geo location of Germany), which would not provide a desirable user localization experience).

Moreover, the public cloud provider, GCP in this example, provides high-speed network connectivity from each of their various regional cloud-based computing service data centers to one or more SaaS providers including Microsoft Office 365® (e.g., using the GCP premium network that utilizes Google owned fiber network connections from their regional cloud platform sites to various SaaS provider sites). As a result, users 204A and 204B of cloud-based security service 200 would also experience a lower latency when connecting to network gateway 202 to access such SaaS provider solutions (e.g., Microsoft Office 365®) thereby further enhancing the user experience when using the SaaS provider solution securely via the cloud-based security service.

Figure 2B:
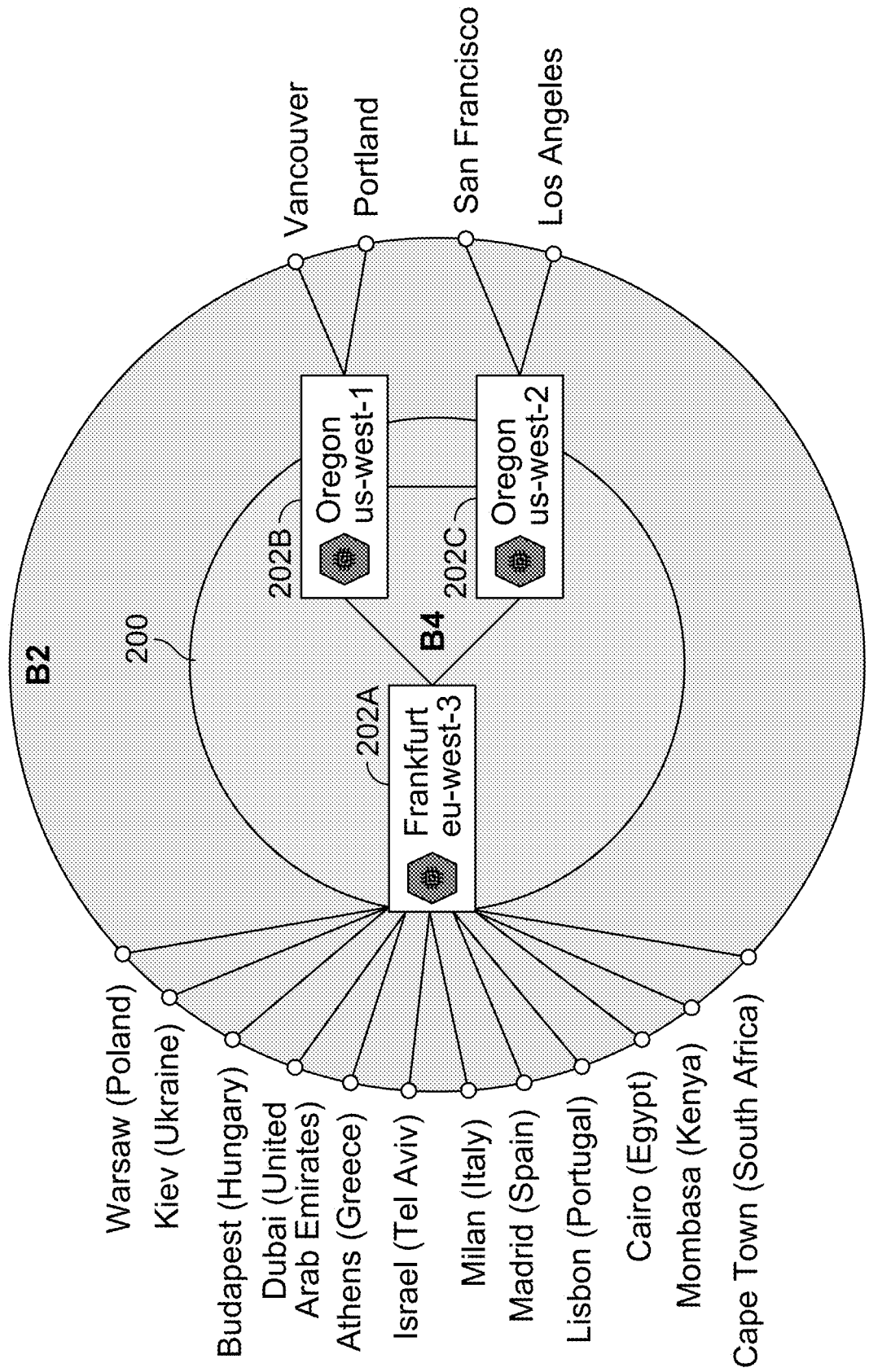
FIG. 2B is another system diagram of an example cloud-based security service in accordance with some embodiments.

FIG. 2B is another system diagram of an example cloud-based security service in accordance with some embodiments. In this example, network gateways 202A, 202B, and 202C of a cloud-based security service 200 are located in different geo locations as shown. As also shown, users of the cloud-based security service that are each located in different locations/regions can be automatically and securely connected to a network gateway of the cloud-based security service provider, such as further described below. For example, users located in Warsaw (Poland) are connected to a network gateway 202A in an eu-west-3 data center located in Frankfurt, Germany; users located in Vancouver, Canada are connected to a network gateway 202B in a us-west-1 data center located in Oregon, United States; and users located in San Francisco, CA are connected to a network gateway 202C in a us-west-2 data center also located in Oregon, United States. In an example implementation, the cloud-based security service can be implemented using a public cloud platform, such as GCP, that currently provides over 130 network edge locations (PoPs), and also provides for a low latency, low loss network with reduced Internet Service Provider (ISP) hops for users of the cloud-based security service to access various supported SaaS solutions as similarly described above.

In one embodiment, the disclosed network gateways (e.g., network gateway 202 of FIG. 2A and network gateways 202A-C of FIG. 2B) are configured to enforce policies (e.g., security policies) regarding communications between client devices and between client devices and servers/other devices, such as users/devices 204A and 204B (e.g., any endpoint device that can perform network communications) and, for example, external destinations (e.g., which can include any devices, servers, and/or web sites/services outside of a protected/secured enterprise network, which are reachable via an external network, such as the Internet). Examples of such policies include ones governing traffic shaping, quality of service, and routing of traffic. Other examples of policies include security policies such as ones requiring the scanning for threats in incoming (and/or outgoing) email attachments, website content, files exchanged through instant messaging programs, and/or other file transfers, etc. In some embodiments, the network gateway is also configured to enforce policies with respect to traffic that stays within a protected/secured enterprise network (not shown in FIGS. 2A and 2B).

FIGS. 3A and 3B are system block diagrams that illustrate example components of a network gateway for a cloud-based security service in accordance with some embodiments. In an example implementation, a network gateway 300A and a network gateway 300B of the cloud-based security service provider can be implemented using a commercially available virtual gateway (e.g., using a security platform, such as a firewall that is commercially available from Palo Alto Networks, Inc.). For example, network gateway 202 of FIG. 2A and network gateways 202A-C of FIG. 2B can each be implemented as shown at 300A in FIGS. 3A and 300B in FIG. 3B as will be described below.

In an example implementation, for mobile users, the cloud-based security service provides an agent (e.g., GlobalProtect application, which is commercially available from Palo Alto Networks, Inc., or another VPN client application can be similarly configured to perform the disclosed operations as described herein) that is deployed and executed on the endpoint device of users of enterprise customers (e.g., mobile users 304A and 304B of FIG. 3B) to automatically and securely connect the mobile user to a regional network gateway. In this example implementation, the cloud-based security service has more than 100 compute locations to accommodate worldwide deployments and provide a localized experience, and the cloud-based security service is configured to map each location to a compute location based on performance and latency.

Specifically, when a mobile user connects to a network gateway of the cloud-based security service provider, the agent performs the following selection process to determine to which gateway to connect. If the mobile user connects in a country that has a local network gateway of the cloud-based security service provider, then the mobile user connects to the network gateway in that location/region (e.g., country). More specifically, the cloud-based security service provider registers network domains for virtual gateways for each supported location/region (e.g., the cloud-based security service provider registers distinct network domains for an Italy virtual gateway (GW) 302A and for a Spain virtual GW 302B as shown in FIG. 3B). The mobile user connects to such registered domains for their local location/region (e.g., country). As shown in FIG. 3B as further described below, such virtual gateways may, in some cases, be executing on a network gateway that is located in a different location/region (e.g., a network gateway that is executing a Spain virtual gateway (GW) and an Italy virtual GW may actually be executed on a server on a GPC site that is located in Germany). Also, if there is more than one gateway in the country (e.g., network gateways 202B and 202C as shown in FIG. 2B), then the mobile user connects to the in-country network gateway that has the lowest latency (e.g., at the time of initiating a secure connection using an IPsec/VPN tunnel to the network gateway). In some cases, users can manually select additional network gateways from their agent (e.g., if network/security administrators have allowed the users to manually select such network gateway). For example, in some configurations, the enterprise customer can, for example, select locations in the cloud-based security service that function as cloud-based network gateways to secure their mobile users.

For remote networks, such as for a branch office in Italy and a branch office in Spain for an enterprise customer of the cloud-based security service, a network admin for the enterprise customer can configure distinct IPsec tunnels (e.g., VPN tunnels) for connecting each such remote network (RN) to one or more network gateways provided by the cloud-based security service provider (e.g., typically configuring them to select to one or more of the nearest located network gateways, and then further network gateway selection criteria can be latency/workload, etc. as similarly described above). The RNs that are configured with distinct IPsec tunnels to two or more network gateways provided by the cloud-based security service provider can also be configured to then select the network gateway that has the lowest latency (e.g., at the time of initiating a secure connection using an IPsec/VPN tunnel to the network gateway).

Referring to FIG. 3A, Italy office 306A is configured to connect via an IPsec/VPN tunnel 326A to Remote Network (RN) Ingress Module 340 of a network gateway 300A of the cloud-based security service. RN Ingress Module 340 is a software component of the virtual network gateway (e.g., implemented in the C programming language or another programming language can be used to implement this component) that performs ingress connection processing and packet inspection using a Control Plane Configuration Module 330A (e.g., implemented using the components of a security platform as similarly described below with respect to FIG. 4B) for security analysis and security policy enforcement (e.g., Control Plane Configuration Module 330A can perform deep packet inspection (DPI) by decoding packets to monitor flows/sessions, perform security policy enforcement, etc.).

Specifically, RN Ingress Module 340 and a Remote Network (RN) Egress Module 350 are configured to perform Source NAT (SNAT) processing operations at the network gateway for a Remote Network (RN). More specifically, RN Ingress Module 340 determines that IPsec tunnel 326A is configured by the enterprise customer to connect from Italy office 306A. In this example implementation, IPsec tunnel configuration information is stored in a Data Store 380 (e.g., when a tunnel is created for a branch office, it is associated with a zone based on the office location), in which a security management platform provides such IPsec configuration information for the enterprise customers of the cloud-based security service to the network gateways in the different regions/locations for the cloud-based security service (e.g., Panorama, which is a commercially available security management platform from Palo Alto Networks, Inc., or another commercially available security management platform can similarly be used to distribute such configuration data that can be stored locally in a table that includes a mapping of such IPsec tunnels to location/region/country zones). As a result, the RN Ingress Module associates any new flows (e.g., new sessions) connecting via IPsec tunnel 326A with the Italy zone (e.g., a new flow/session table stored in Data Store 380 can be updated to associate the determined location/region, in this case, the Italy zone, with the new flow/session so that the location data (Italy zone) is included in the meta data associated with that new flow/session). To complete the SNAT processing operations for the new flow/session (e.g., in which the SNAT processing operations determine the egress IP address based on the zone associated with the new flow/session), RN NAT Egress Module 350 selects/allocates an IP address from a pool of public IP addresses for Italy for that tenant to assign a new Italy based public IP address as an egress IP address (e.g., an egress IP address generally refers to an IP address that the cloud-based security service uses for egress traffic to the Internet, such as for accessing a web site/(SaaS) service on the Internet) for the new flow/session as shown at 370A (e.g., public IP addresses by country/zone can be obtained by the cloud-based security service provider for each customer/tenant and then distributed to each network gateway for local storage, such as in Data Store 380). The above-described SNAT processing operations can similarly be performed for new flows/sessions connecting from the Spain office 306B via a distinct IPsec tunnel 326B to assign a new Spain based public IP address as an egress IP address for the new flow/session as shown at 370B.

In some cases, the above-described zones for performing the SNAT processing operations to select an egress IP address can be based on a region within a country. As an example, an enterprise customer may have two remote network (RN) locations deployed in Canada: Central Canada and Eastern Canada. Both locations in this example map to the Canada compute location (e.g., a network gateway located in Canada). However, the Quebec Province in Canada uses a different default language (French) than other provinces in Canada (English). As such, the network gateway of the cloud-based security service is configured to assign sessions from these distinct RNs different egress IP addresses to achieve the desired locality user experience as similarly described above (e.g., the locations use different egress IP addresses to ensure that the user gets the correct default language for the region when connected to a web site/(SaaS) service).

Referring to FIG. 3B, each virtual gateway (GW), including Italy Virtual GW 302A and Spain Virtual GW 302B, is configured with a distinct registered domain name (e.g., Fully Qualified Domain Name (FQDN)/IP address). When an Italy Mobile User 304A attempts to connect to a network gateway 300B, the agent executing on the endpoint device of Italy Mobile User 304A initiates a network connection to the registered domain name (e.g., Fully Qualified Domain Name (FQDN)/IP address) associated with Italy Virtual GW 302A (e.g., as the agent is configured to initiate connections to the registered domain name, Fully Qualified Domain Name (FQDN), of the virtual gateway(s) available in the mobile user's current location). As a result, Italy Virtual GW 302A automatically determines that the incoming user's location is Italy and the meta data associated with the new flow/session for Italy Mobile User 304A can be stored in Data Store 380 as similarly described above. To complete the SNAT processing operations for the new flow/session (e.g., in which the SNAT processing operation determines the egress IP address based on the zone associated with the new flow/session), Mobile User (MU) NAT Egress Module 360 selects/allocates an IP address from a pool of public IP addresses for Italy for that tenant to assign a new Italy based public IP address as an egress IP address for the new flow/session as shown at 370C as similarly described above (e.g., public IP addresses by country/zone can be obtained by the cloud-based security service provider for each customer/tenant and then distributed to each network gateway for local storage, such as in Data Store 380). The above-described SNAT processing operations can similarly be performed for new flows/sessions connecting from Spain Mobile User 304B via Spain Virtual GW 302B to assign a new Spain based public IP address as an egress IP address for the new flow/session as shown at 370D.

In this example implementation, the network gateways of the cloud-based security service provider thereby efficiently and securely implement the disclosed techniques for enhanced user experience of locality for web sites/services by performing Source NAT (SNAT) processing operations on incoming user sessions that are connecting to sites outside of the user's enterprise network to access a web site/service on the Internet. Specifically, such user sessions are assigned an egress IP address that is associated with the location/region of the user's incoming session to the network gateway as opposed to an egress IP address that is assigned to the network gateway that may be located in a different location/region and/or that network gateway IP address is associated with a location/region that is distinct from the user's location/region as similarly described above. In this example implementation, the network gateway of the cloud-based security service provider (e.g., the PAN-OS operating system of Palo Alto Networks' firewalls) is configured to support the disclosed new SNAT capability (e.g., SNAT processing operations) for providing localization at scale for a cloud-based security service.

As similarly described above, in this example implementation, the cloud-based security service provider also maintains a set of IP address ranges for each of their supported locations/regions (e.g., PoPs) to use as distinct public IP address pool for each customer/tenant of the cloud-based security service provider's service (e.g., as opposed to requiring that each of their customer's provide, for example, hundreds of such public IP address ranges). Also, by maintaining such public IP address pools distinct for each customer/tenant, the cloud-based security service provider also facilitates a more secure solution for each of their customers (e.g., as opposed to have such a public IP address pool that is shared across distinct customers) as well as facilitating the localization at scale benefits of the disclosed techniques (e.g., by supporting such techniques at a hundreds of PoPs). For example, customers can utilize the distinct public IP address pool to implement various security policies (e.g., ACME Company can allow user sessions connecting to their Salesforce® service to bypass multifactor authentication based on the assigned public IP address of the user sessions given that the cloud-based security service provider utilizes a public IP address pool that is distinct and only used for users associated with the ACME Company).

Figure 4A:
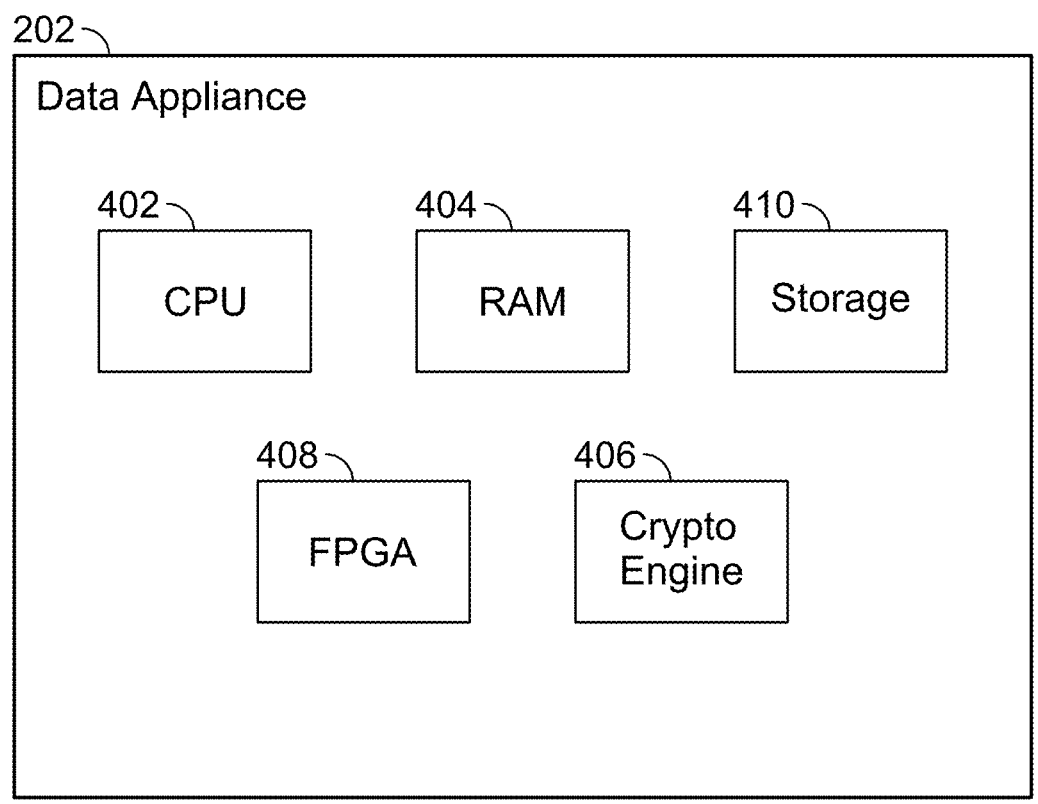
FIG. 4A illustrates an embodiment of a network gateway in accordance with some embodiments.

An embodiment of network gateway 202 is shown in FIG. 4A. The example shown is a representation of physical components that can be included in network gateway 202 if the network gateway is implemented as a data appliance, in various embodiments. Specifically, the data appliance includes a high-performance multi-core Central Processing Unit (CPU) 402 and Random Access Memory (RAM) 404. The data appliance also includes a storage 410 (such as one or more hard disks or solid-state storage units). In various embodiments, the data appliance stores (whether in RAM 404, storage 410, and/or other appropriate locations) information used in monitoring an enterprise network and implementing the disclosed techniques. Examples of such information include application identifiers, content identifiers, user identifiers, requested URLs, IP address mappings, policy and other configuration information, signatures, hostname/URL categorization information, malware profiles, and machine learning models. The data appliance can also include one or more optional hardware accelerators. For example, the data appliance can include a cryptographic engine 406 configured to perform encryption and decryption operations, and one or more Field Programmable Gate Arrays (FPGAs) 408 configured to perform matching, act as network processors, and/or perform other tasks.

Functionality described herein as being performed by the data appliance can be provided/implemented in a variety of ways. For example, the data appliance can be a dedicated device or set of devices. The functionality provided by the data appliance can also be integrated into or executed as software on a general purpose computer, a computer server, a gateway, and/or a network/routing device. In some embodiments, at least some services described as being provided by the data appliance are instead (or in addition) provided to a client device (e.g., client device 204A) by software executing on the client device.

Whenever the data appliance is described as performing a task, a single component, a subset of components, or all components of the data appliance may cooperate to perform the task. Similarly, whenever a component of the data appliance is described as performing a task, a subcomponent may perform the task and/or the component may perform the task in conjunction with other components. In various embodiments, portions of the data appliance are provided by one or more third parties. Depending on factors such as the amount of computing resources available to the data appliance, various logical components and/or features of the data appliance may be omitted, and the techniques described herein adapted accordingly. Similarly, additional logical components/features can be included in embodiments of the data appliance as applicable. One example of a component included in the data appliance in various embodiments is an application identification engine which is configured to identify an application (e.g., using various application signatures for identifying applications based on packet flow analysis). For example, the application identification engine can determine what type of traffic a session involves, such as Web Browsing—Social Networking; Web Browsing—News; SSH; and so on.

The disclosed system processing architecture can be used with different types of cloud in different deployment scenarios, such as the following: (1) public cloud; (2) private cloud on-premises; and (3) inside high-end physical firewalls, some processing power can be allocated to execute a private cloud (e.g., using the management plane (MP) in the Palo Alto Networks PA-5200 Series firewall appliances).

Figure 4B:
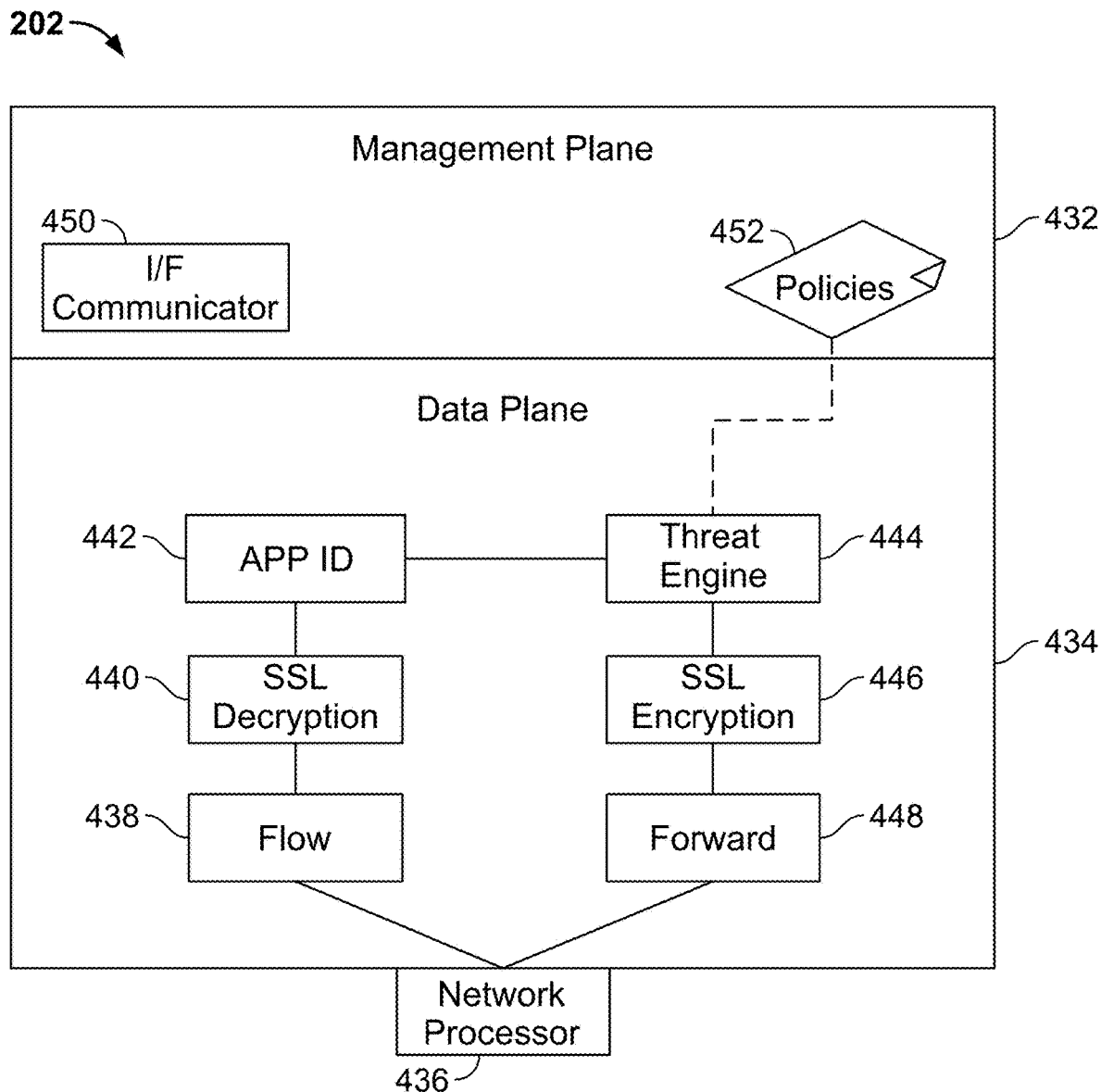
FIG. 4B is a functional diagram of logical components of an embodiment of a data appliance.

FIG. 4B is a functional diagram of logical components of an embodiment of a data appliance. The example shown is a representation of logical components that can be included in network gateway 202 in various embodiments. Unless otherwise specified, various logical components of network gateway 202 are generally implementable in a variety of ways, including as a set of one or more scripts (e.g., written in Java, python, etc., as applicable).

As shown, network gateway 202 comprises a firewall, and includes a management plane 432 and a data plane 434. The management plane is responsible for managing user interactions, such as by providing a user interface for configuring policies and viewing log data. The data plane is responsible for managing data, such as by performing packet processing and session handling.

Network processor 436 is configured to receive packets from client devices, such as client device 204, and provide them to data plane 434 for processing. Whenever flow module 438 identifies packets as being part of a new session, it creates a new session flow. Subsequent packets will be identified as belonging to the session based on a flow lookup. If applicable, SSL decryption is applied by SSL decryption engine 440. Otherwise, processing by SSL decryption engine 440 is omitted. Decryption engine 440 can help network gateway 202 inspect and control SSL/TLS and SSH encrypted traffic, and thus help to stop threats that might otherwise remain hidden in encrypted traffic. Decryption engine 440 can also help prevent sensitive content from leaving an enterprise/secured customer's network. Decryption can be controlled (e.g., enabled or disabled) selectively based on parameters such as: URL category, traffic source, traffic destination, user, user group, and port. In addition to decryption policies (e.g., that specify which sessions to decrypt), decryption profiles can be assigned to control various options for sessions controlled by the policy. For example, the use of specific cipher suites and encryption protocol versions can be required.

Application identification (APP-ID) engine 442 is configured to determine what type of traffic a session involves. As one example, application identification engine 442 can recognize a GET request in received data and conclude that the session requires an HTTP decoder. In some cases, e.g., a web browsing session, the identified application can change, and such changes will be noted by network gateway 202. For example a user may initially browse to a corporate Wiki (classified based on the URL visited as "Web Browsing—Productivity") and then subsequently browse to a social networking site (classified based on the URL visited as "Web Browsing—Social Networking"). Different types of protocols have corresponding decoders.

Based on the determination made by application identification engine 442, the packets are sent, by threat engine 444, to an appropriate decoder configured to assemble packets (which may be received out of order) into the correct order, perform tokenization, and extract out information. Threat engine 444 also performs signature matching to determine what should happen to the packet. As needed, SSL encryption engine 446 can re-encrypt decrypted data. Packets are forwarded using a forward module 448 for transmission (e.g., to a destination).

As also shown in FIG. 4B, policies 452 are received and stored in management plane 432. Policies can include one or more rules, which can be specified using domain and/or host/server names, and rules can apply one or more signatures or other matching criteria or heuristics, such as for security policy enforcement for subscriber/IP flows based on various extracted parameters/information from monitored session traffic flows. An interface (UF) communicator 450 is provided for management communications (e.g., via (REST) APIs, messages, or network protocol communications or other communication mechanisms).

Additional logical components/features can be included in this example embodiment. For example, the network gateway components described above with respect to FIGS. 3A-B (e.g., location-based virtual gateways such as shown at 302A and 302B, RN Ingress Module 340, RN NAT Egress Module 350, MU NAT Egress Module 360, and/or Data Store 380, etc.) can also be included in the data appliance in various embodiments.

Figure 5A:
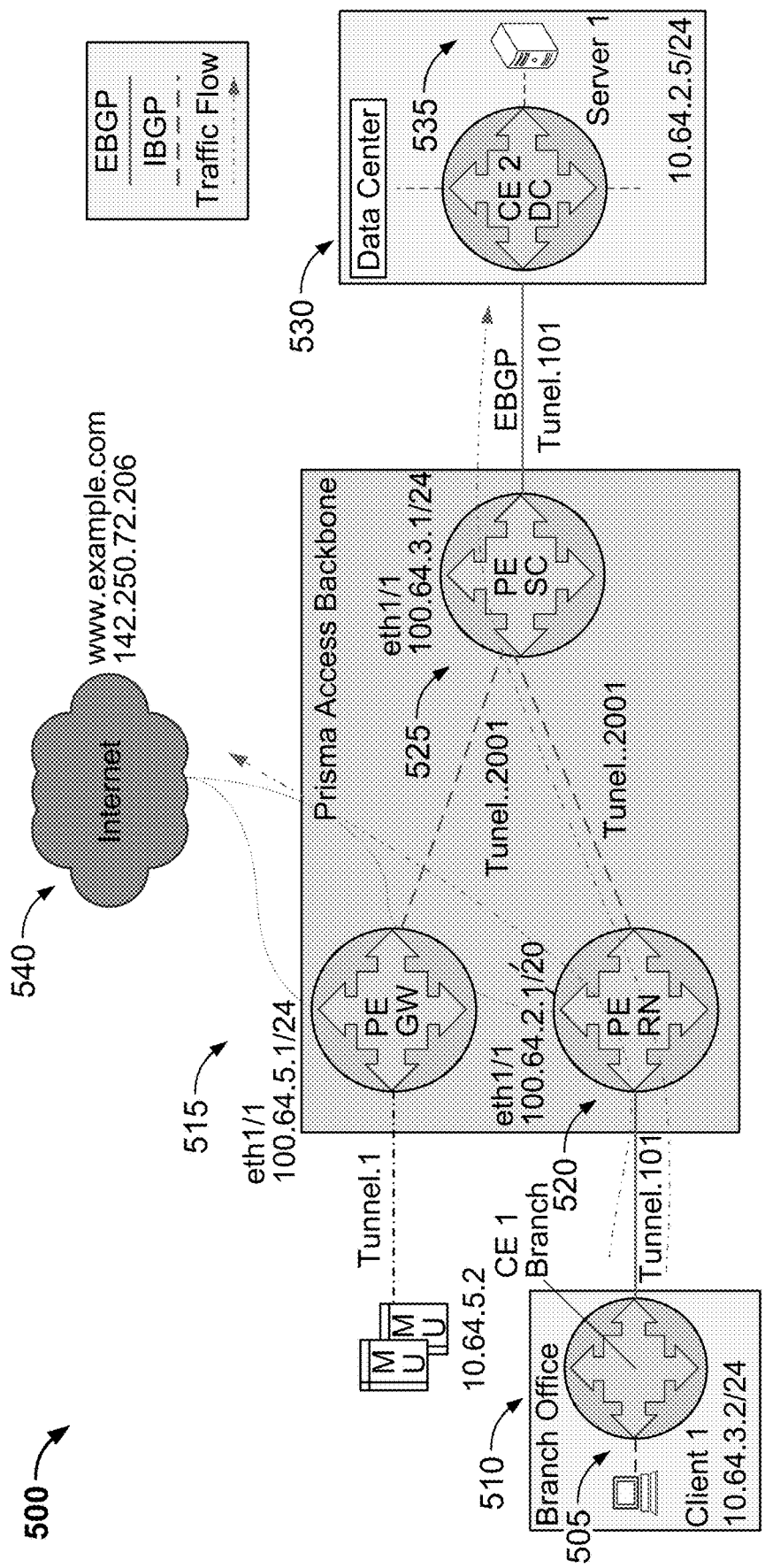
FIG. 5A illustrates an example of an architecture for routing to network addresses using a cloud-based security service.

FIG. 5A illustrates an example of an architecture for routing to network addresses using a cloud-based security service. In some embodiments, the architecture 500 includes a client 505 of a branch office 510, a cloud-based security service (or Prisma Access Backbone) 515 including a first router 520 and a second router 525, a server 535 of a data center 530, and the Internet 540.

As an example, the cloud-based security service 515 uses address spaces of 100.64.5.0/24, 100.64.2.1/20 and 100.64.3.0/24, as defined in RFC 6598, within its network, and the customer uses address spaces of 10.64.5.2/24, 10.64.3.0/24, and 100.64.2.0/24, as defined in RFC 1918, within their network. In the example, the client 505 can access both the Internet 540 and the server 535 of the data center 530 using the cloud-based security service 515.

Figure 5B:
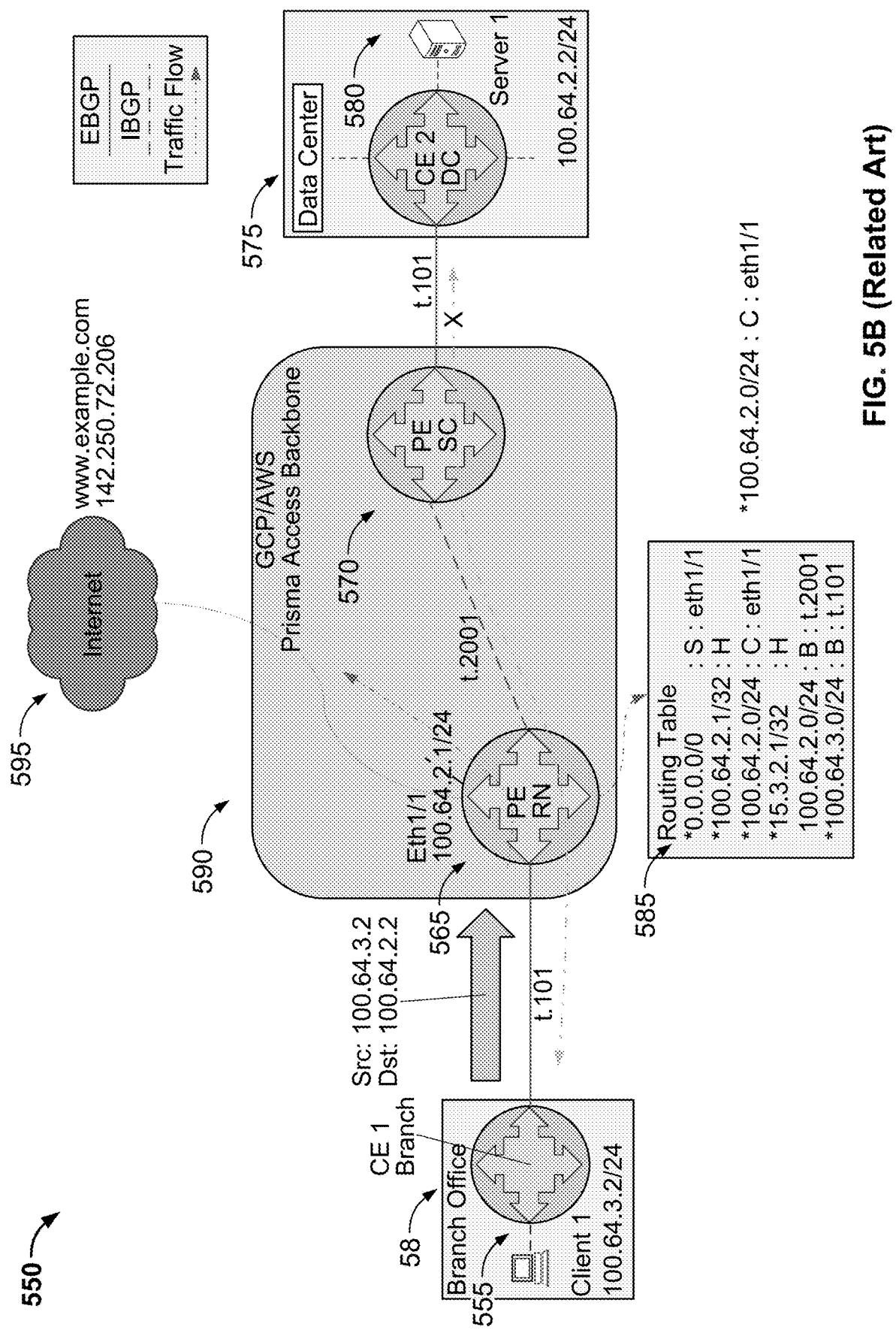
FIG. 5B illustrates an example of an architecture for routing to overlapping network addresses using a conventional cloud-based security service.

FIG. 5B illustrates an example of an architecture for routing to overlapping network addresses using a conventional cloud-based security service. In some embodiments, the architecture 550 includes a client 555 of a branch office 560, a cloud-based security service (or Prisma Access Backbone) 590 including a router 565 and a second router 570, a server 580 of a data center 575, and the Internet 595, and the router 565 includes a routing table 585.

In this example, due to address exhaustion or some other reason, the cloud-based security service 590 uses an address space of 100.64.2.0/24, as defined in RFC 6598, within its network, and the customer uses address spaces of 100.64.3.0/24 and 100.64.2.0/24, as also defined in RFC 6598, within their network.

In the routing table 585, customer routes, e.g., 100.64.2.0/24 and 100.64.3.0/24 are learned via border gateway protocol (BGP), and the other routes in the routing table 585 are cloud-based security service routes. The third entry and the fifth entry of the routing table 585 are overlapping because they have the same route 100.64.2.0/24. Because the third entry and the fifth entry are overlapping, only one of the entries can be active. In this example, the customer route (fifth entry) is deactivated.

As an example, when the client 555 of the branch office 560 attempts to access the server 580 of the branch office 575 via the cloud-based security service 590, a source IP address of a packet originating from the client is 100.64.3.2 and a destination IP address of the server 580 is 100.64.2.2. The packet arrives at the router 565, which performs a routing table lookup via the routing table 585. From the routing table 585, the router 565 determines that the best match is the third entry, which routes the traffic via interface eth1/1, and sends the packet to the Internet 595. As an aspect, the packet should be routed to the server 580 of the data center 575 instead of the Internet 595 because the destination IP address corresponds to IP address of the server 580. In this example, the routing issue illustrates issues when using an overlapping address space.

Figure 6:
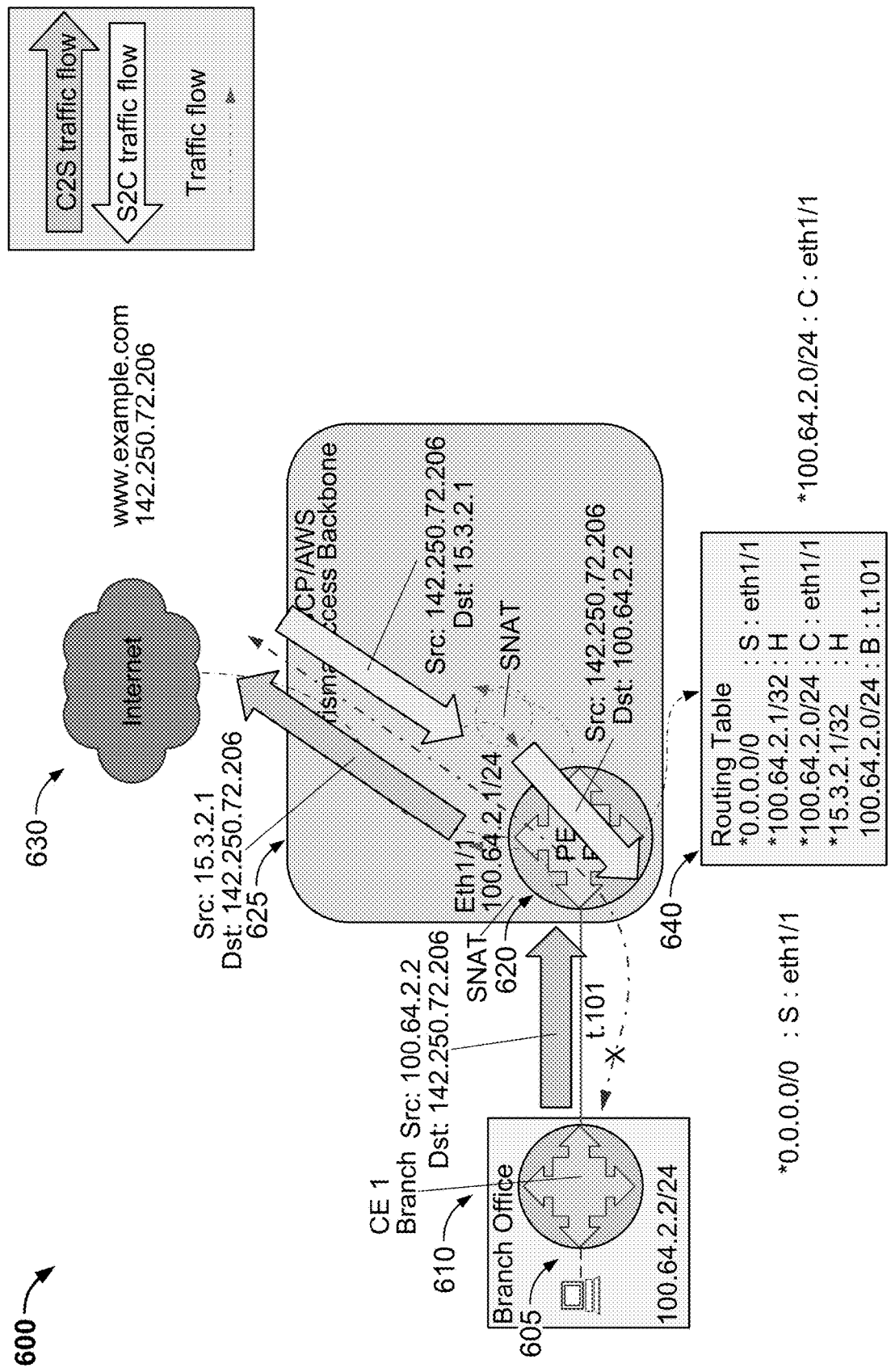
FIG. 6 illustrates another example of an architecture for routing to overlapping network addresses using a conventional cloud-based security service.

FIG. 6 illustrates another example of an architecture for routing to overlapping network addresses using a conventional cloud-based security service. In some embodiments, the architecture 600 includes a client 605 of a branch office 610, a cloud-based security service (or Prisma Access Backbone) 625 including a router 620, and the Internet 630, and the router 620 includes a routing table 640.

In this example, the cloud-based security service 625 uses an address space of 100.64.2.0/24, as defined in RFC 6598, within its network, and the customer uses an address space of 100.64.2.0/24, as also defined in RFC 6598, within their network. Because the first three octets of the address space of the cloud-based security service 590 matches the first three octets of an address space of the customer, the third entry and the fifth entry of the routing table 640 are overlapping because they have the same route 100.64.2.0/24.

Because the customer route, e.g., 100.64.2.0/24 is learned via BGP, the customer route (fifth entry of the routing table 640) in the routing table 640 is not active because the third entry being a connect route (C) is preferred to a BGP learned route (B).

As an example, when the client 605 of the branch office 610 attempts to access the Internet 630 via the cloud-based security service 625, a source IP address of a packet originating from the client 605 is 100.64.3.2 and a destination IP address of the Internet 630 (e.g., www.myexample.com) is 142.250.72.206. The packet arrives at the router 620, which performs a routing table lookup via the routing table 640. From the routing table 640, the router 620 determines that the best match is the default route, which routes the traffic via the interface eth1/1, and sends the packet to the Internet 630. Because the source IP address is a private IP address, the source IP address 100.64.2.2 of the packet is translated to a public IP address of 15.3.2.1 via SNAT, so that return traffic can be properly routed back to the router 620. Return traffic from the Internet 630 can reverse the source IP address and the destination IP address (e.g., source IP Address 142.250.72.206 and destination IP Address 15.3.2.1). Upon return, at the router 620, the router 620 can perform a reverse SNAT on the return traffic so that the destination IP address of the packet is translated from a public IP address of 15.3.2.1 to a private IP address of 100.64.2.2. At the router 620, the router 620 performs a routing table lookup via the routing table 640 to determine where the packet should be sent. From the routing table 640, the router 620 determines that the best match is the third entry, which routes the return traffic via the interface eth1/1, and sends the packet back to the Internet 620. As an aspect, the return traffic packet should have been routed to the client 605 of the branch office 610 instead of the Internet 630, and this routing situation creates a routing loop because return traffic coming in from the interface eth1/1 will go out via the interface eth1/1 and never gets to the client 605. This router issue illustrates a problem when using an overlapping address space.

Figure 7:
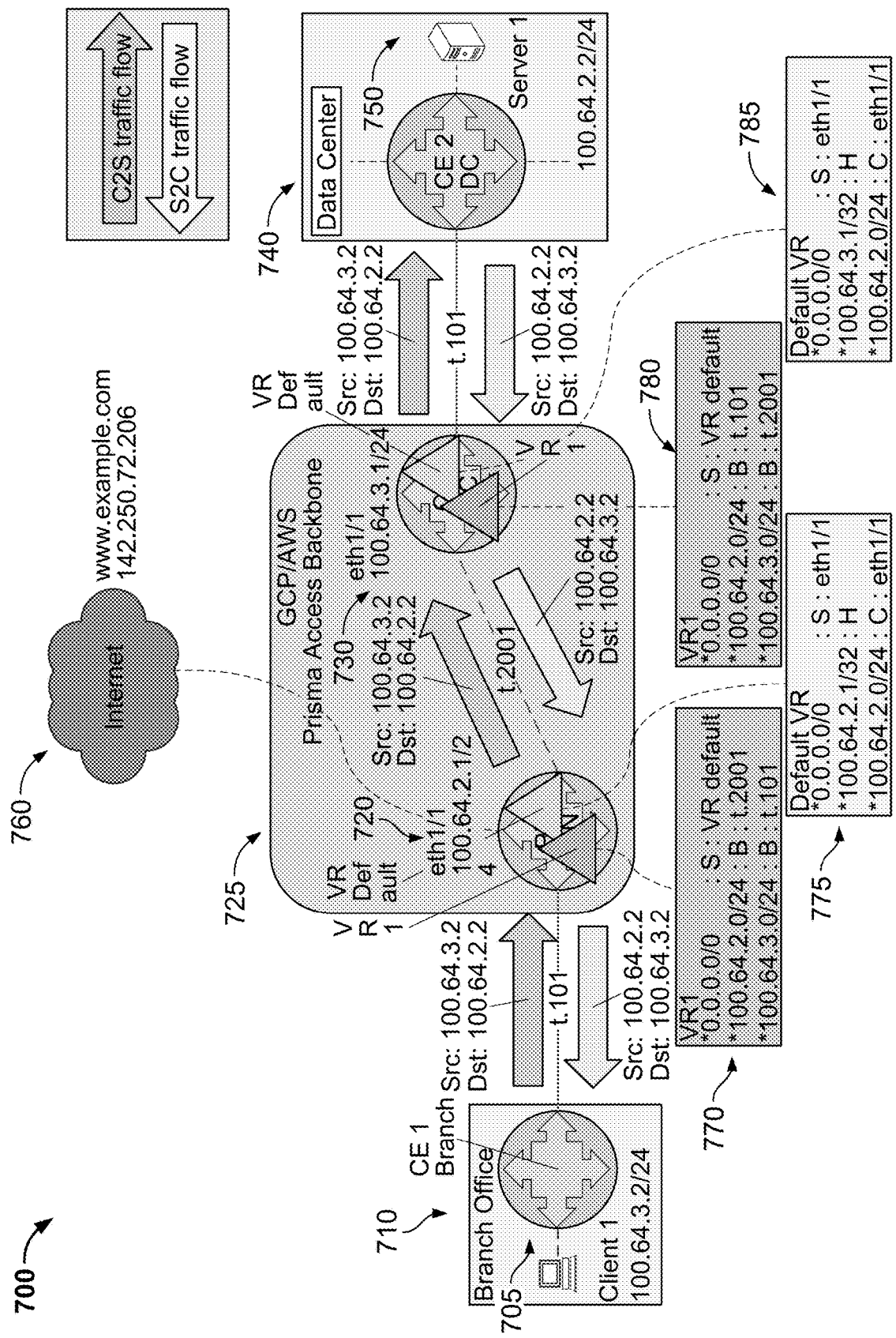
FIG. 7 illustrates an example of an architecture for routing to overlapping network addresses using a cloud-based security service including more than one virtual router.

FIG. 7 illustrates an example of an architecture for routing to overlapping network addresses using a cloud-based security service including more than one virtual router. In some embodiments, the architecture 700 includes a client 705 of a branch office 710, a cloud-based security service (or Prisma Access Backbone) 725 including a first router 720 and a second router 730, a server 750 of a data center 740, and the Internet 760, the first router 720 includes a first virtual router 770 and a second virtual router 775, and the second router 730 includes a first virtual router 780 and a second virtual router 785. In some embodiments, each virtual router includes a routing table.

In this example, the cloud-based security service 725 uses address spaces of 100.64.2.0/24 and 100.64.3.0/24, as defined in RFC 6598, within its network, and the customer uses address spaces of 100.64.3.0/24 and 100.64.2.0/24, as also defined in RFC 6598, within their network. Because the first three octets of the address space of the cloud-based security service 725 matches the first three octets of an address space of the customer for both 100.64.2.0/24 and 100.64.3.0/24, there are overlapping network address spaces.

The cloud-based security service 725 includes the first router 720 and the second router 730, and at least two virtual routers are created for the first router 720 where one of the virtual routers VR1 (the first virtual router 770) is dedicated to the customer and the default virtual router Default VR (the second virtual router 775) is dedicated to the enterprise or the cloud-based security service 725 and at least two virtual routers are created for the second router 730 where one of the virtual routers VR1 (the first virtual router 780) is dedicated to the customer and the default virtual router Default VR (the second virtual router 785) is dedicated to the enterprise or the cloud-based security service 725. Because the overlapping network address spaces are addressed by different routing tables of the at least two virtual routers, the overlapping network address spaces are isolated from each other, so the overlapping network address spaces are routable. In addition, a policy-based forwarding (PBF) rule is created to guarantee a return of Internet bound traffic, for example, a symmetric return is performed on the return traffic. As a result, network traffic can be guaranteed to reach its destination. On the other hand, since conventional security services only have a default virtual router for each router, overlapping network address spaces are not routable.

For the first router 720, because the customer routes, e.g., 100.64.2.0/24 and 100.64.3.0/24 are learned via BGP, the customer routes are located in the first virtual router 770. As an example, the first virtual router 770 includes an entry 100.64.2.0/24 for interface t.2001, an entry 100.64.3.0/24 for interface t.101, and the default route has the VR default as its next hop. In the default VR or the second virtual router 775, the default route corresponds with the interface eth1/1.

For the second router 730, because the customer routes, e.g., 100.64.2.0/24 and 100.64.3.0/24 are learned via BGP, the customer routes are located in the first virtual router 780. As an example, the first virtual router 780 includes an entry 100.64.2.0/24 for interface t.101, an entry 100.64.3.0/24 for interface t.2001, and the default route has the VR default as its next hop. In the default VR or the second virtual router 785, the default route corresponds with the interface eth1/1.

As an aspect, even if the customer is using RFC 6598 network addresses or other private IP addresses, for example, addresses associated with RFC 1918, those RFC 6598 network addresses or the other private IP addresses are routable.

As an example, the client 705 of the branch office 710 sends traffic to the server 750 of the data center 740 over the interface t.101, which belongs to the customer. In the example, the traffic (e.g., source: 100.64.3.2 and destination: 100.64.2.2) is transmitted from the client's IP address to the server's IP address. The first router 720 receives the traffic on interface t.101 and performs a routing table lookup via the first virtual router 770 since the traffic relates to the customer network. In the example, a match is found with the second entry of the first virtual router 770 and the first router 720 forwards the traffic to the next hop (the second router 730) via the interface t.2001. At the second router 730, because the traffic arrived from interface t.2001, the second router 730 uses the first virtual router 780 to determine the traffic's next destination. Since the traffic originated from the customer network (interface t.2001), the second entry of the first virtual router 780 indicates that the traffic should be forwarded to the next hop (interface t.101) to reach the server 750 at the data center 740.

In the return traffic from the data center 740, the return traffic has its source IP address and destination IP address reversed (e.g., source: 100.64.2.2 and destination: 100.64.3.2) where the destination IP address relates to the client's IP address. The second router 730 receives the return traffic and performs a routing table lookup via the first virtual router 780 since the traffic relates to the customer network to route the return traffic. The second router 730 determines that the return traffic should be forwarded using the last entry or third entry of the first virtual router 780 (100.64.3.0/24 t.2001) of the first virtual router 780 and should be sent over interface t.2001 to the first router 720. Upon reaching the first router 720, the first router 720 performs a routing table lookup using the first virtual router 770 and determines that the return traffic should be sent to the client 705 over the t.101 interface based on the third entry of the first virtual router 770 (100.64.3.0/24 t.101), so the client 705 of the branch office 710 receives a response via the interface t.101.

In the multi-virtual router configuration, the network traffic destined for a shared address space is routed correctly instead of getting dropped in a single virtual router configuration.

Figure 8:
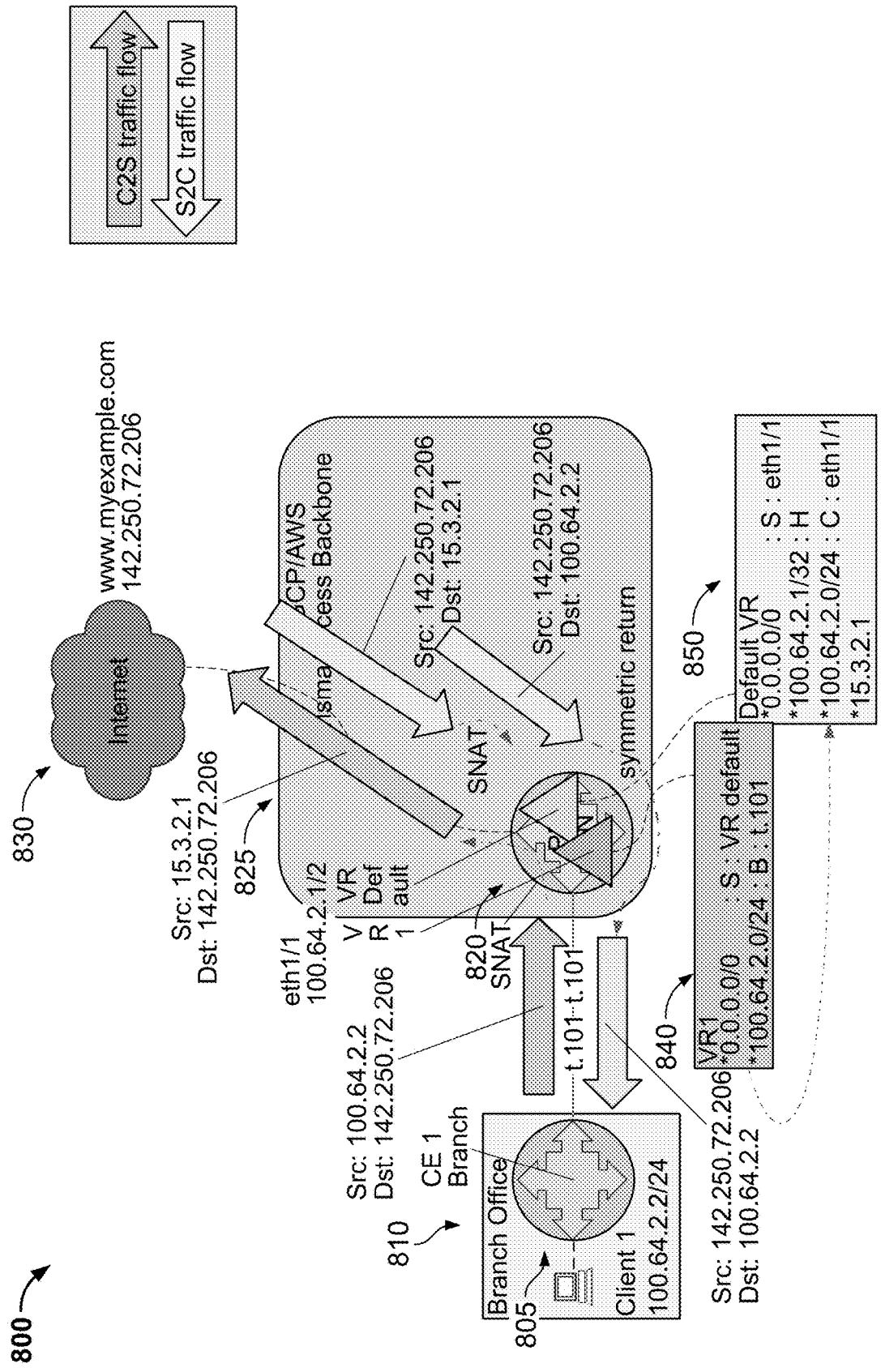
FIG. 8 illustrates another example of an architecture for routing to overlapping network addresses using a cloud-based security service including more than one virtual router.

FIG. 8 illustrates another example of an architecture for routing to overlapping network addresses using a cloud-based security service including more than one virtual router. In some embodiments, the architecture 800 includes a client 805 of a branch office 810, a cloud-based security service (or Prisma Access Backbone) 825 including a router 820, and the Internet 830, and the router 820 includes a first virtual router 840 and a second virtual router 850. In some embodiments, each virtual router includes a routing table.

In this example, the cloud-based security service 825 uses an address space of 100.64.2.0/24, as defined in RFC 6598, within its network, and the customer uses address spaces of 100.64.2.0/24, as also defined in RFC 6598, within their network. Because the first three octets of the address space of the cloud-based security service 825 matches the first three octets of an address space of the customer, there are overlapping network addresses.

For the router 820, because the customer route, e.g., 100.64.2.0/24 is learned via BGP, the customer routes are located in the first virtual router 840. As an example, the first virtual router 840 includes an entry 100.64.2.0/24 for interface t.101, and the default route has the VR default as its next hop. In the default VR or the second virtual router 850, the default route corresponds with the interface eth1/1.

In this example, the client 805 of the branch office 810 sends traffic to the Internet (e.g., www.myexample.com 142.250.72.206) over the interface t.101, which belongs to the customer. In the example, the traffic (e.g., source: 100.64.2.2 and destination: 142.250.72.206) is transmitted from the client's IP address to the Internet IP address of 142.250.72.206. The router 820 receives the traffic on the interface t.101 and performs a routing table lookup via the second virtual router 850. In the example, the router 820 determines that the default route (0.0.0.0/0) is the best match for the Internet IP address (142.256.72.206), and the default route indicates that the next hop is interface eth1/1, so the traffic is sent to the Internet 830 via the interface eth1/1. Because the source IP address is a private IP address, the source IP address 100.64.2.2 of the packet is translated to a public IP address of 15.3.2.1 via SNAT, so that return traffic can be properly routed back to the router 820.

The return traffic from the Internet 830 can reverse the source IP address and the destination IP address (e.g., source IP Address 142.250.72.206 and destination IP Address 15.3.2.1). Upon return, at the router 820, the router 820 can perform a reverse SNAT on the return traffic so that the destination IP address of the packet is translated from a public IP address of 15.3.2.1 to a private IP address of 100.64.2.2.

Because the return traffic comes in from the Internet 830 via the interface eth1/1, typically, the router 820 performs a routing table lookup using the second virtual router 850 and determines that the default route is the best match where the next hop is the interface eth1/1. As an aspect, because the return traffic came in via the interface eth1/1, the router 820 does not want to reroute the return traffic out the same interface (eth1/1) that it was received, so the routing table lookup is bypassed and instead a symmetric return is performed on the return traffic. On the other hand, if a routing table lookup was performed, the return traffic would not be sent back to the client 805 in the branch office 810. In the symmetric return, the return traffic is returned to where it originally came from, which is interface t.101, so the client 805 of the branch office 810 receives the return traffic via the interface t.101.

In the multi-virtual router and symmetric return configuration, the network traffic originating from a shared address space and bound for the Internet is routed correctly instead of getting dropped in a single virtual router configuration or a configuration without a symmetric return.

As an additional benefit, having the two separate virtual routers with separate routing tables provides added security because the customer routes are kept separated from the provider routes.

Figure 9:
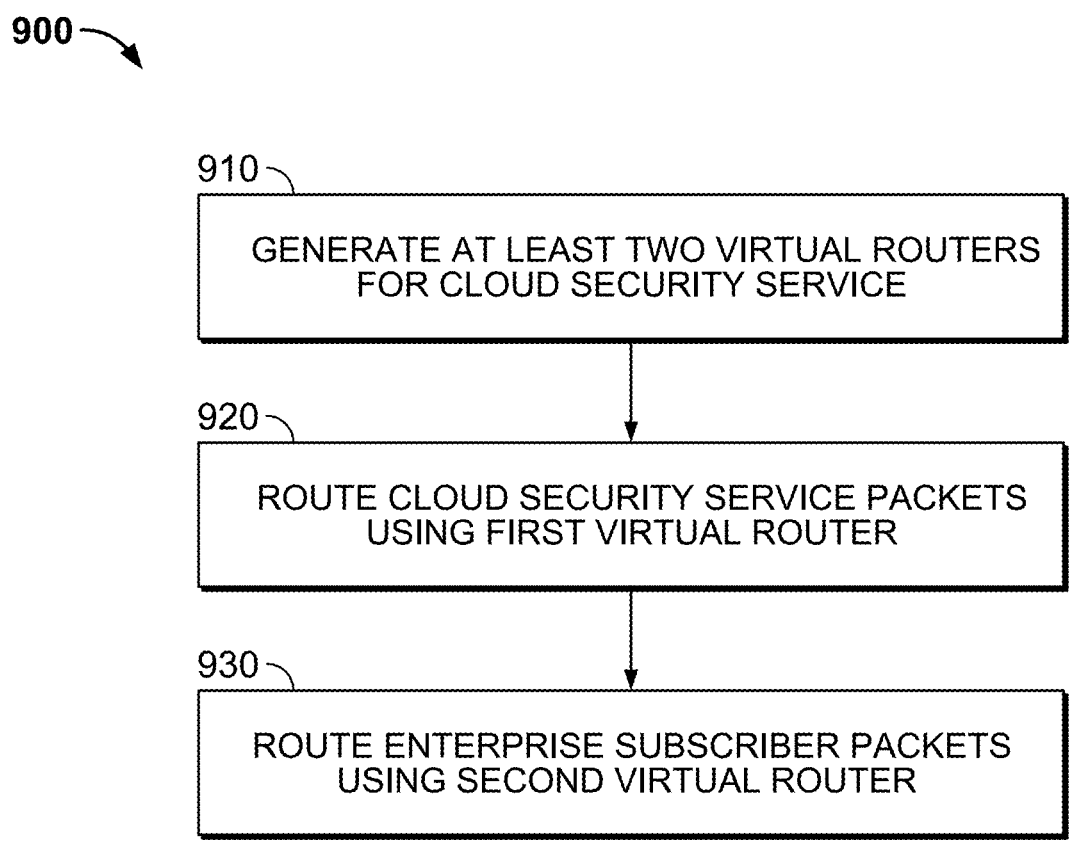
FIG. 9 is a flow diagram illustrating a process for supporting overlapping network addresses universally in accordance with some embodiments.

FIG. 9 is a flow diagram illustrating a process for supporting overlapping network addresses universally in accordance with some embodiments. In some embodiments, the process 900 is implemented by the cloud-based security service 725 of FIG. 7 or the cloud-based security service 825 of FIG. 8 and includes:

In 910, the cloud-based security service generates at least two virtual routers for a cloud security service. In some embodiments, the at least two virtual routers include a first virtual router and a second virtual router. In some embodiments, the first virtual router includes a first routing table, and the second virtual router includes a second routing table.

In 920, the cloud-based security service routes cloud security service packets using the first virtual router.

In 930, the cloud-based security service routes enterprise subscriber packets using the second virtual router.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
generate at least two virtual routers for a cloud security service, wherein the at least two virtual routers include a first virtual router and a second virtual router, wherein a first IP address space of a cloud security service provider and a second IP address space of an enterprise subscriber have an overlapping IP address space, the overlapping IP address space corresponding to at least a first portion of the first IP address space being the same as at least a second portion of the second IP address space, the first IP address space being located in a different geographical location from the second IP address space;
route cloud security service packets using the first virtual router; and
route enterprise subscriber packets using the second virtual router, wherein Internet bound traffic originating from the overlapping IP address space of the second IP address space is routed by the first virtual router to the Internet and return traffic coming from the Internet is routed by a symmetric return returning packets via a router interface that the packets were originally received bypassing a routing table lookup; and
a memory coupled to the processor and configured to provide the processor with instructions.

2. The system of claim 1, wherein:
the first virtual router includes a first routing table; and
the second virtual router includes a second routing table.

3. The system of claim 1, wherein the cloud security service includes a policy-based forwarding rule to guarantee the symmetric return for the Internet bound traffic.

4. The system of claim 1, wherein the overlapping IP address space includes RFC 6598 IP addresses.

5. The system of claim 1, wherein the overlapping IP address space includes RFC 1918 IP addresses.

6. The system of claim 1, wherein the overlapping IP address space becomes routable using the at least two virtual routers, wherein the first virtual router has a first routing table, and wherein the second virtual router has a second routing table.

7. The system of claim 1, wherein:
the first virtual router is dedicated for a cloud security service provider IP address space;
the first virtual router has a first routing table; the second virtual router is dedicated for an enterprise subscriber IP address space; and
the second virtual router has a second routing table.

8. The system of claim 1, wherein traffic originating from a client associated with an enterprise subscriber destined for a data center associated with the enterprise subscriber is routed using a routing table lookup via a customer routing table associated with the second virtual router.

9. The system of claim 1, wherein traffic originating from a client associated with an enterprise subscriber destined for an Internet site is routed using a chained routing table lookup.

10. The system of claim 1, wherein the cloud security service includes a set of firewalls for security filtering of network traffic to/from a network of an enterprise subscriber.

11. A method, comprising:
generating at least two virtual routers for a cloud security service, wherein the at least two virtual routers include a first virtual router and a second virtual router, wherein a first IP address space of a cloud security service provider and a second IP address space of an enterprise subscriber have an overlapping IP address space, the overlapping IP address space corresponding to at least a first portion of the first IP address space being the same as at least a second portion of the second IP address space, the first IP address space being located in a different geographical location from the second IP address space;
routing cloud security service packets using the first virtual router; and
routing enterprise subscriber packets using the second virtual router, wherein Internet bound traffic originating from the overlapping IP address space of the second IP address space is routed by the first virtual router to the Internet and return traffic coming from the Internet is routed by a symmetric return returning packets via a router interface that the packets were originally received bypassing a routing table lookup.

12. The method of claim 11, wherein:
the first virtual router includes a first routing table; and
the second virtual router includes a second routing table.

13. The method of claim 11, wherein the cloud security service includes a policy-based forwarding rule to guarantee the symmetric return for the Internet bound traffic.

14. The method of claim 11, wherein the overlapping IP address space includes RFC 6598 IP addresses.

15. The method of claim 11, wherein the overlapping IP address space includes RFC 1918 IP addresses.

16. A computer program product embodied in a non-transitory computer readable medium and comprising computer instructions for:
generating at least two virtual routers for a cloud security service, wherein the at least two virtual routers include a first virtual router and a second virtual router, wherein a first IP address space of a cloud security service provider and a second IP address space of an enterprise subscriber have an overlapping IP address space, the overlapping IP address space corresponding to at least a first portion of the first IP address space being the same as at least a second portion of the second IP address space, the first IP address space being located in a different geographical location from the second IP address space;
routing cloud security service packets using the first virtual router; and
routing enterprise subscriber packets using the second virtual router, wherein Internet bound traffic originating from the overlapping IP address space of the second IP address space is routed by the first virtual router to the Internet and return traffic coming from the Internet is routed by a symmetric return returning packets via a router interface that the packets were originally received bypassing a routing table lookup.

17. The computer program product of claim 14, wherein the cloud security service includes a policy-based forwarding rule to guarantee the symmetric return for the Internet bound traffic.

* * * * *